(12) United States Patent
Castaldi et al.

(10) Patent No.: US 6,619,902 B1
(45) Date of Patent: Sep. 16, 2003

(54) AUTOMATED STORAGE AND RETRIEVAL SYSTEM AND INDEXING/INSERTION EXTRACTION MECHANISM THEREFOR

(76) Inventors: John Castaldi, 785 Carroll St., Brooklyn, NY (US) 11215; Boris Lyubchik, 1013 Ave. J, Apt. E-11, Brooklyn, NY (US) 11230

( * ) Notice: Subject to any disclaimer, the term of this patent is extended or adjusted under 35 U.S.C. 154(b) by 0 days.

(21) Appl. No.: 08/798,867

(22) Filed: Feb. 11, 1997

(51) Int. Cl.⁷ .................................................. B65G 1/04
(52) U.S. Cl. ................................. 414/280; 198/465.1
(58) Field of Search ........................... 414/280, 282, 414/284, 286, 661, 750; 198/465.1

(56) References Cited

U.S. PATENT DOCUMENTS

| 4,556,355 A | * | 12/1985 | Glater ........................ 414/280 |
| 4,656,949 A | * | 4/1987 | Ragot ................. 198/465.1 X |
| 4,690,602 A | * | 9/1987 | Castaldi et al. ......... 414/280 X |
| 4,756,657 A | * | 7/1988 | Kinney .................... 414/661 X |
| 5,199,840 A | * | 4/1993 | Castaldi et al. ............. 414/280 |
| 5,213,463 A | * | 5/1993 | Rothlisberger et al. ..... 414/280 |
| 5,263,378 A | * | 11/1993 | Loomer .................. 414/750 X |
| 5,328,316 A | * | 7/1994 | Hoffmann ............... 414/282 X |

FOREIGN PATENT DOCUMENTS

| DE | 2743395 | * | 12/1978 | ................. 414/280 |
| DE | 3633508 | * | 4/1988 | ................. 414/280 |

* cited by examiner

Primary Examiner—James W. Keenan
(74) Attorney, Agent, or Firm—Mitchell A. Stein; Stein & Associates, P.C.

(57) ABSTRACT

A storage and retrieval system includes at least two pairs of two confrontingly opposed, columnar arrays. Each of the pairs of columnar arrays defines a plurality of vertically spaced tray-receiving recesses, and an access region between the columns, in which an indexing/insertion/extraction mechanism is positioned for pulling bins or trays housed in the recesses. The mechanism has a platform vertically displaceable in the access regions between the pairs of arrays; a shuttle table rollably mounted upon the platform for horizontal displacement thereupon between the pairs of arrays; and an extractor assembly supported by the shuttle table for causing horizontal insertion/extraction of bins onto the shuttle table.

4 Claims, 17 Drawing Sheets

INITIAL POSITION, EMPTY PLATFORM

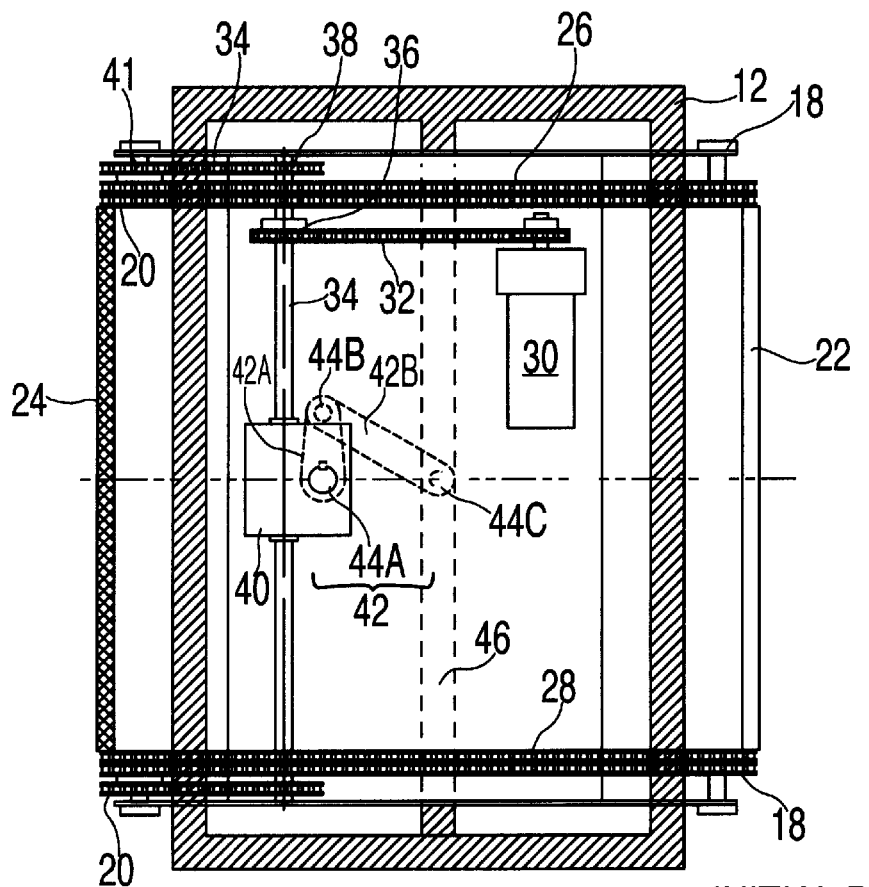
FIG. 5C INITIAL POSITION, EMPTY PLATFORM
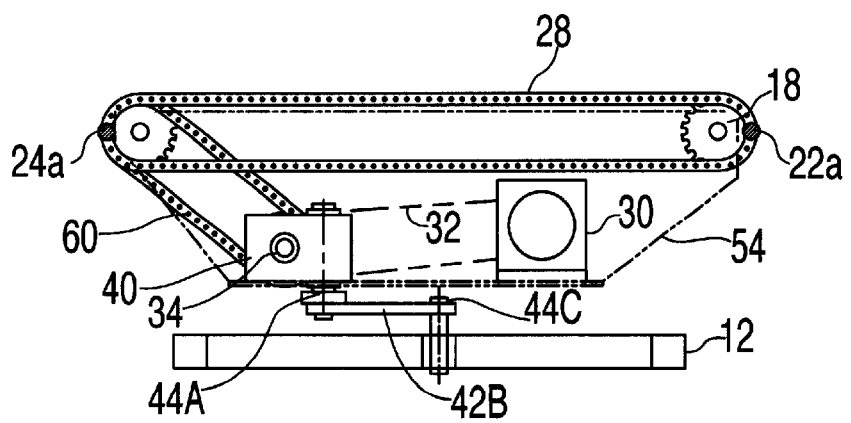
FIG. 5D

EXTENDED
FRONT POSITION

CENTER POSITION, BIN ON PLATFORM

EXTENDED REAR POSITION

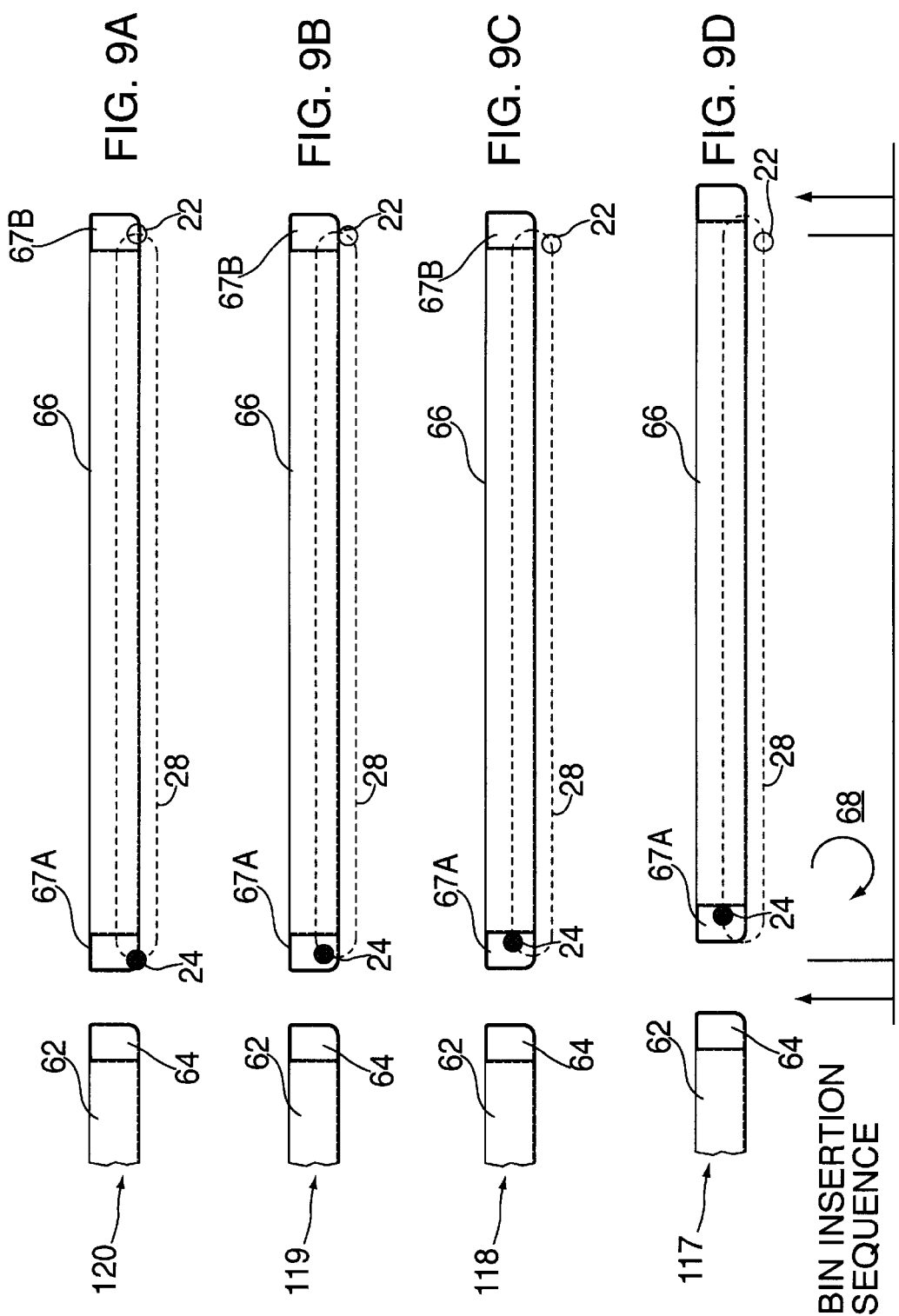

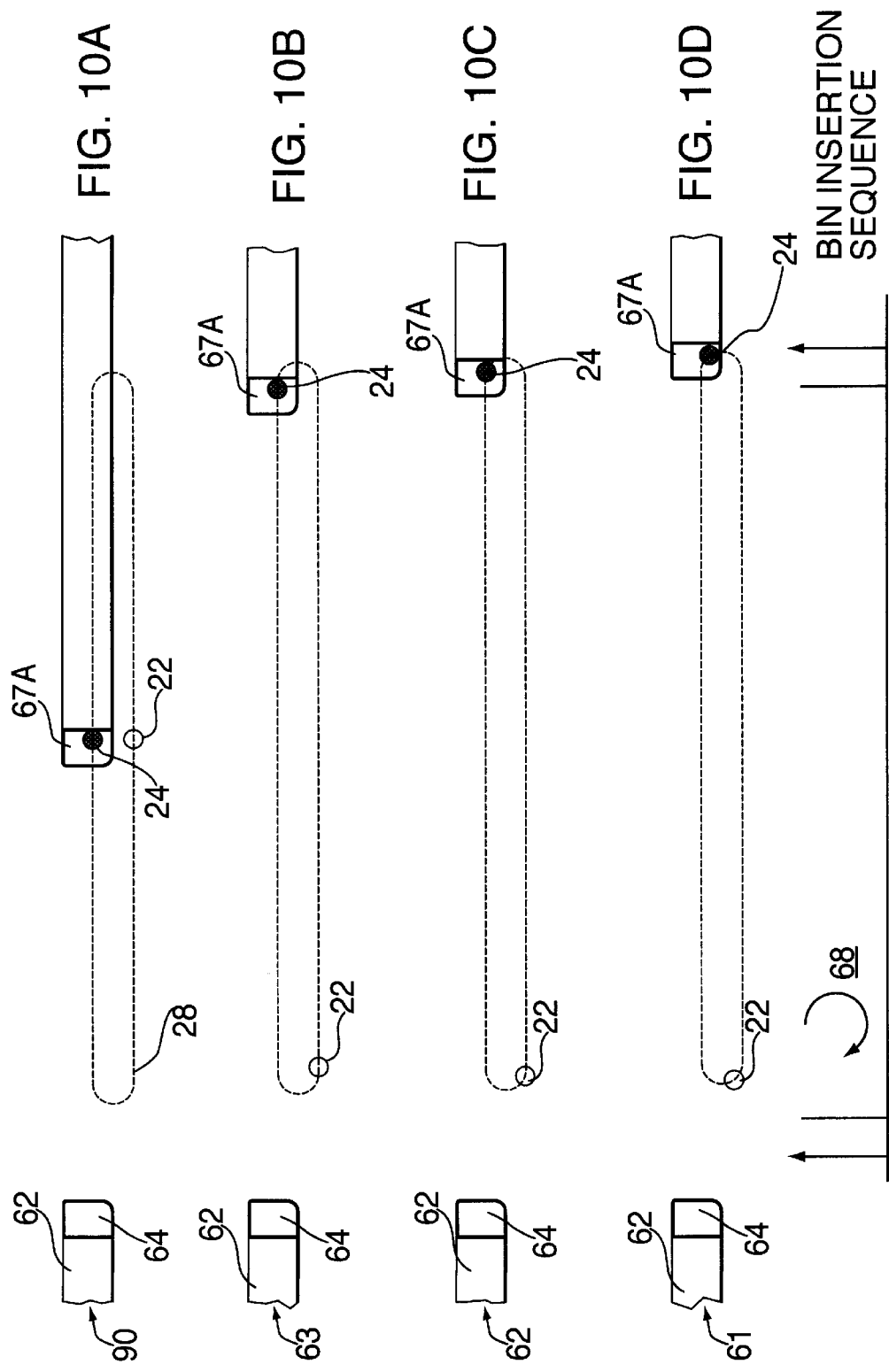

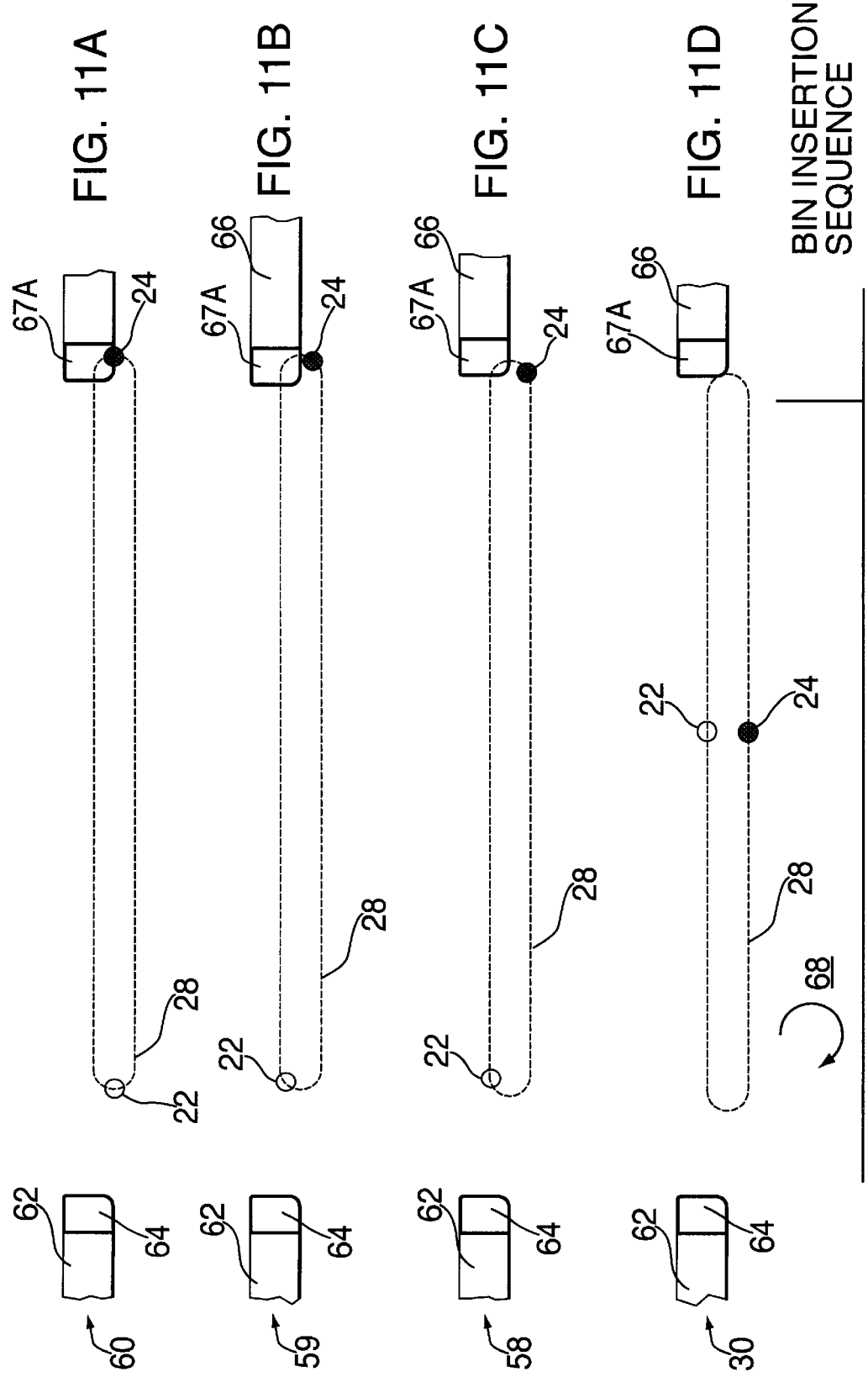

BIN EXTRACTION SEQUENCE

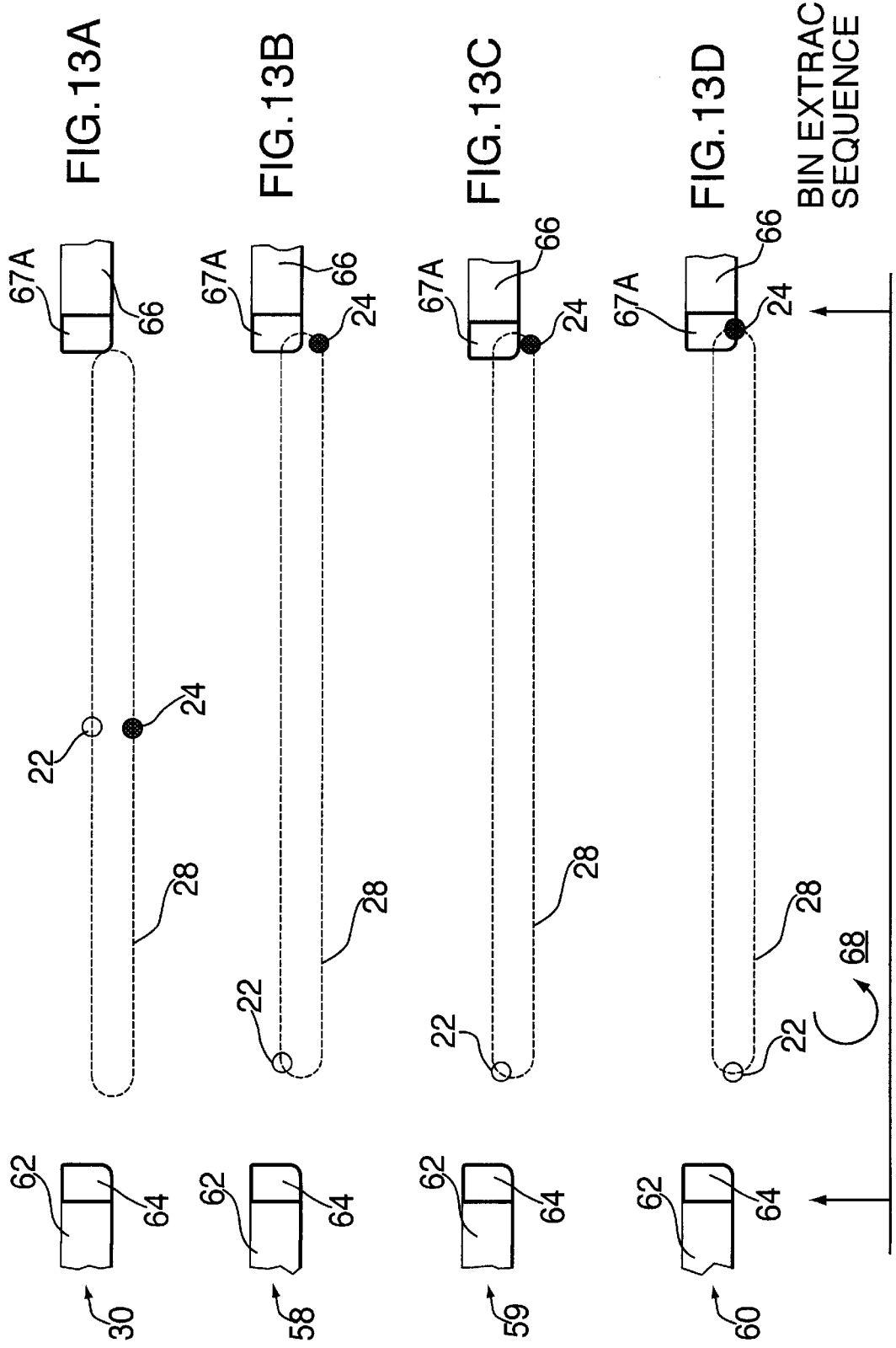

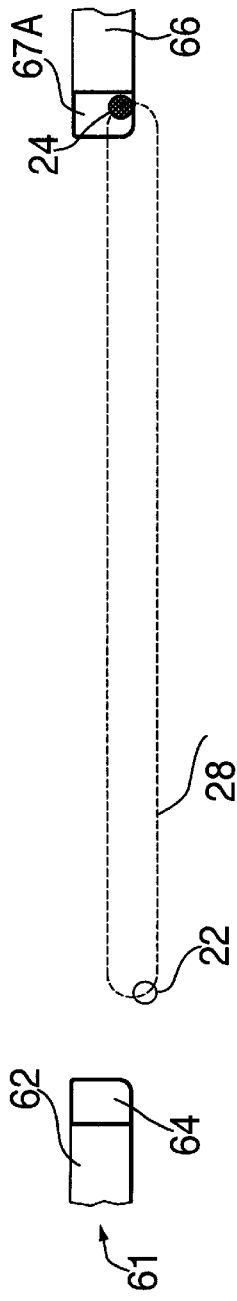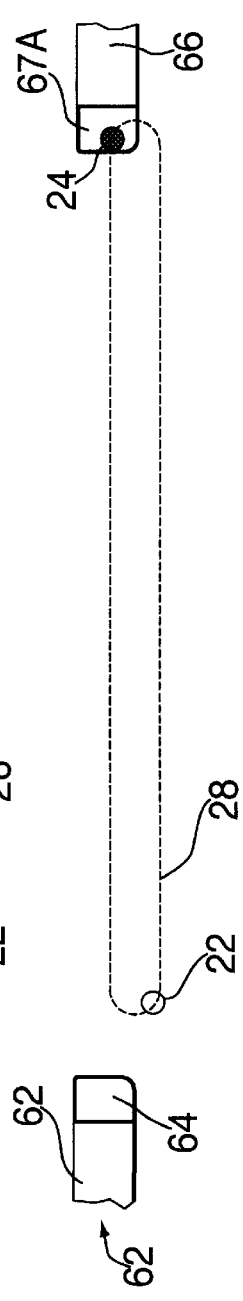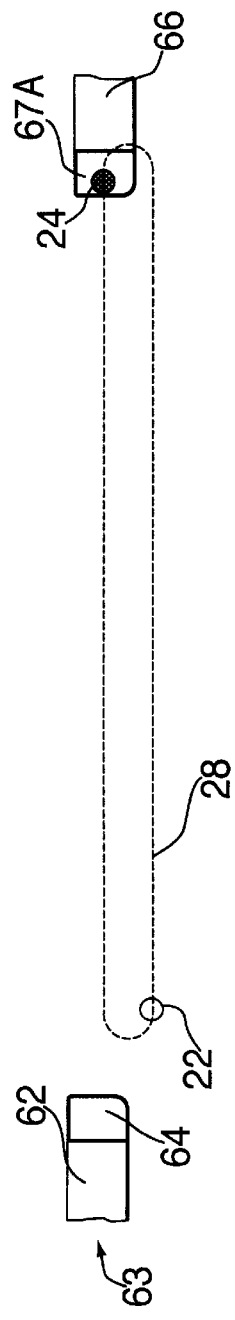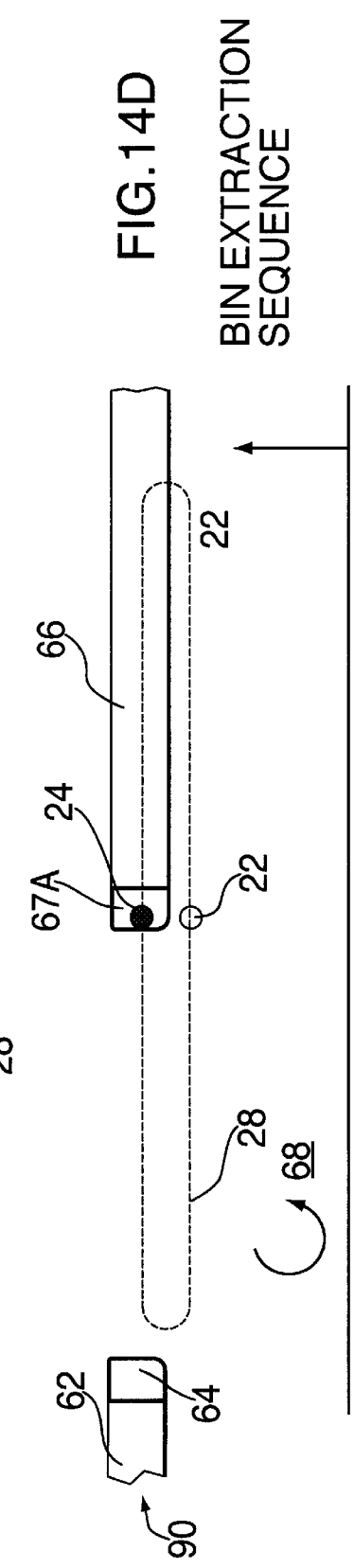

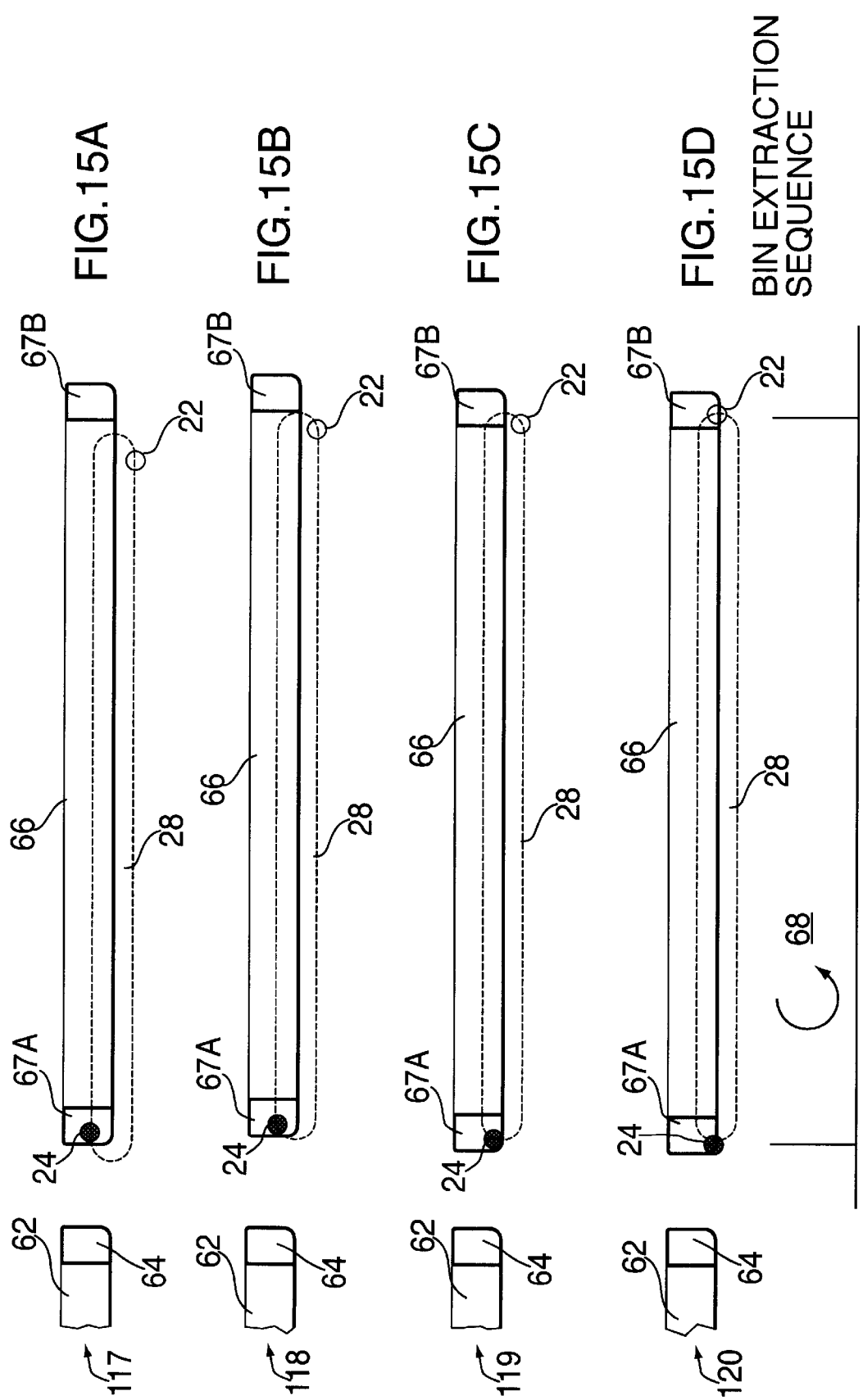

AUTOMATED STORAGE AND RETRIEVAL SYSTEM AND INDEXING/INSERTION EXTRACTION MECHANISM THEREFOR

FIELD OF THE INVENTION

The present invention relates to automated article storage and retrieval systems in which articles are stored in bins, palettes or trays located within and along arrays of such trays, the trays are vertically spaced apart within recesses defined along the columnar arrays and are separated by an access region within which a platform is vertically and horizontally displaceable into registration with such array-supported trays or tray positions. More particularly, the invention is directed to a system having at least two such pairs of columnar arrays, each array in each pair confrontingly opposed with an access region therebetween, in which a single platform carrying a shuttle table is positioned to index/insert/extract bins from each array intra- or inter-each such array/pair such that the trays are selectively withdrawn from and inserted into the arrays by an indexing/insertion/extraction mechanism carried on the shuttle table. The indexing/insertion/extraction mechanism is also suitable for other, large scale systems in which bins are stored in arrays, including multiple confrontingly opposed columns in which the movable platform also moves in frontwards to backwards motion along a rail or other supporting member between groups of such confrontingly opposed columns.

BACKGROUND OF THE INVENTION

Warehousing of articles has long been sought in order to achieve efficient use of space and inventory control. Many automated storage and retrieval systems provide high density storage with ready access to the stored articles. For example, commonly-invented U.S. Pat. No. 4,690,602 discloses a two-dimensional array of storage bins which are extractable for accessing stored articles by an extractor that moves down a center aisle between opposing arrays, locates the proper column of the array, moves upwardly or downwardly with respect to the column, and aligns with a proper bin location for extraction of a bin. The bin is thereafter extracted onto a platform, the platform with the bin carried thereupon is traversed to the front of the aisle, and the bin is presented for access to the articles stored therein.

In the '602 patent, a two-dimensionally displaceable platform first traverses the aisle upon a rail without interference with the bins, and then extends arm-like extractor elements into the storage location past the front edge of a bin for engagement with the sides of the bin thereby providing withdrawal of the bin from the array, and similar reinsertion of the bin into the same or a different storage location.

Such multi-columnar arrays, while viable for the storage of a multiplicity of articles in light of the many locations for insertion and extraction of bins, create issues of complexity relative to the need for two-dimensional movement of the platform, and are thus typically not economically justifiable for smaller storage requirements.

Thus, an industry has developed that includes single, stand-alone units having a pair of confrontingly opposed columns for storage of bins, and a single platform that traverses the accessible region between the two columns. In such arrangements, the platform moves only in the single vertical dimension in the accessible region, by moving upwardly and downwardly. In such instances, extraction of bins from their respective locations in the columnar arrays is typically accomplished by either the use of fingers mounted to a single chain that catch a lip or extension mounted on the front of the bin (and back of the bin, respectively to allow full support and delivery), or by the use of opposing bars that are chain driven to catch such lips, as disclosed in commonly-invented U.S. Pat. No. 5,199,840. Since the platform for carrying the insertion/extraction mechanism in such stand-alone systems does not traverse a distance between multiple arrays, such a system does not include an ability to extend or index the mechanism into alignment, and to retract the mechanism to allow such additional traversal.

Insertion/extraction mechanisms found in the prior art, whether for large systems or stand-alone systems, typically employ fingers or bars that travel rotationally about a sprocket in order to extend into alignment with the lip or extension of the bin sought to be removed. Thus, the primary path of motion into alignment is rotational until the finger or bar is engaged. In these instances, sufficient distance must be created between vertically displaced bins such that the finger or bar, as it moves rotationally into alignment with the lip or extension of the bin to be extracted, does not collide with the bin positioned above or below. Thus the distance between bins in such arrangement is related to the radius of the circle traversed by the finger or pin about the sprocket that drives the finger or pin into alignment. Moreover, the same sprocket (with chain) assembly is both the driving force for engagement with the lip or extension, as well as for moving the finger or pin as the bin is extracted or inserted.

While large miniload systems offer too much storage space for certain applications, single, stand-alone units often offer too little. In these instances, customers generally purchase more than one stand-alone unit. The industry has heretofore failed to provide a system that enables the storage capacity of two (or more) stand-alone units, while having only a single platform conveyance system, motor drives, and controller. Thus, where purchasers buy more than one stand-alone unit, each has its own platform, motor drives and controller. In short, every item is merely duplicated.

In such stand-alone systems, like commonly invented U.S. Pat. No. 5,199,840 discussed above, the platform moves only in the vertical dimension, since the extractor must only access bins adjacent to the platform in the horizontal dimension. Thus, the '840 patent requires the double-bar assembly to engage the front of a bin with its first bar, and substantially extract the bin onto the extractor until engagement by the second bar. No provision is made for accessing regions that are displaced in arrays adjacent to the two linearly confrontingly-opposed columns, nor would the apparatus function for such access.

It is thus an object of the instant invention to provide an indexing/insertion/extraction mechanism for use in large systems as well as smaller stand-alone systems that provides positive insertion and extraction and the ability to store at least twice the average number of bins of stand-alone systems by providing at least two pairs of confrontingly-opposed columns, while employing a single platform conveyor, drive mechanism, and controller.

SUMMARY OF THE INVENTION

The foregoing and other objects are achieved by the instant invention which involves a storage and retrieval system including at least two pairs of two confrontingly opposed, columnar arrays. Each of the pairs of columnar arrays defines a plurality of vertically spaced tray-receiving recesses, and an access region between the columns, in which an indexing/insertion/extraction mechanism is position for pulling bins or trays housed in the recesses. The mechanism has a platform vertically displaceable in the access regions between the pairs of arrays; a shuttle table rollably mounted upon the platform for horizontal displacement thereupon between the pairs of arrays; an extractor assembly supported by the shuttle table for causing horizontal insertion/extraction of bins onto the shuttle table, the assembly comprising a pair of endless chains each trained about first and second pairs of extractor sprockets, a drive rod positioned between one of the pairs of extractor sprockets, and two pairs of bin engagement fingers or two rods each traversing the distance between the endless chains for engaging the bin engagement members, such that as the drive rod is driven the bin engagement fingers or rods are caused to travel between and about the first and second pairs of extractor sprockets; a reducer having an input and output portions for indexingly engaging the extractor assembly for indexing the extractor assembly toward and away from the bins in gearingly synchronized sequence with the simultaneous driving of the pair of engagement rods, in which the reducer input portion is driven by a worm gear shaft and the reducer output portion in turn drives a linkage assembly; the worm gear shaft driven by a worm gear shaft sprocket and in turn driving a sprocket and chain assembly gearingly causing the simultaneous driving of the drive rod for the endless chains; the linkage assembly comprising a pivotally mounted pair of elongated members that pivot at three points of pivot, in which one of the members is attached at the first point of pivot to the reducer output portion of the reducer, the one of the members is attached at the second point of pivot to the second elongated member which in turn is attached at the third point of pivot to a vertical linkage shaft, such that as said reducer portion is caused to rotate, the rotation in turn causes circular rotation of the first elongated member and swinging rotation of the second member thereby linearly extending the linkage assembly from a smallest to largest distance $d_{linkage}$ comprising the length of the first elongated member from the first to the second point of pivot and thereby indexing the extraction mechanism an index distance (d) from a neutral position do to a minimum/maximum distance $\pm d_{linkage}$; and a drive motor for causing the vertical linkage shaft to travel in a substantially straight-pathed groove in the shuttle table; and a single motor for cooperatively driving the indexing and movement of the bin engagement fingers or bars by chain engagement driving of the worm gear shaft sprocket. In this situation, $$d = d_{linkage} \sin K n_t$$

where K represents a constant derived from sprocket size, chain length and reducer gear ratio, and $n_t$ is a movement of the engagement rods as a measured by the number of teeth moved by the sprockets, and further wherein:

$$\tfrac{1}{2}(n_c/n_s) = \tfrac{1}{4} n_d$$

and $n_c$ is the number of teeth in the chain, $n_s$ is the number of teeth on the sprocket, and $n_d$ is the reducer gear ratio.

The double-bar assemblies of the prior art (as in, e.g., commonly-invented U.S. Pat. No. 5,199,840) cannot be used in anything but a rack assembly with two confrontingly-opposed columns. This is because the assembly cannot be shuttled over to another pair of columns, as in the instant invention. Consequently, in order to double the capacity of the prior art devices, more than one of the identical devices would have to be used. As a result, twice the controllers and twice the platforms and extractor mechanisms needed to be employed.

The instant invention overcomes the problem by use of a shuttle table rollably supported on a platform. In the preferred embodiment, a double pair of fingers are employed for insertion/extraction of bins. Alternatively, a double-bar extraction device can be employed. In either event, indexing is provided to allow the fingers or bars to engage the bins and pull/push them onto and off of the platform. Thus, the double-bar extraction mechanism of the past has been re-invented in a manner that provides that the first pair of fingers (or first bar) actually does not engage the bin handle, but rather passes by the bin handle as the entire mechanism is advanced/indexed into closer proximity, at which point the second pair of fingers (or second bar) engages. It can be observed that in distinction to the prior art devices, substantial withdrawal of the bin does not occur by way of the fingers or bars. Rather it occurs by way of the fingers (or bars) in combination with the indexer, and it is the indexer that completes the actual substantial removal or insertion of the bin.

Thus, it is observed that the gear ratios are important, as is the reducer and linkage assembly to accomplish synchronized movements. Such synchronization is also provided in a novel manner by use of only a single motor drive which drives a shaft attached to the reducer on its one side, and attached to a sprocket and driving assembly on the other for simultaneously driving the double-finger (or bar) assembly.

As a result, tight packing of bins can be achieved without the concern that spacing is a requirement for the bars to spin into alignment. Indeed, alignment now occurs by indexing. Likewise, much larger arrays can be handled either by increasing the length of the platform supporting the shuttle table, or rendering the platform on a stacker for miniload-type configurations. As customer needs continue to be improved and defined, this modular arrangement proves less expensive, since it possesses fewer components, and more modularly definable for customer needs, then multiple purchases and installations of the same stand-alone system.

Other features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims.

BRIEF DESCRIPTION OF THE DRAWINGS

In the drawings, wherein similar reference characters denote similar elements through the several views:

FIGS. 5C and 5D show an alternative embodiment of the invention shown in FIGS. 5A and 5B showing a double-bar insertion/extraction mechanism with indexer;

FIG. 9 is a diagrammatical representation of the bin insertion sequence of the subject invention showing an initial pathway for insertion of a bin in a rearwards location of the array;

FIG. 10 is a diagrammatical representation of the bin insertion sequence of the subject invention showing in a time-based manner the movement of the bin, commencing after the movements shown in FIG. 9, wherein the bin is positioned at a point just prior to substantial insertion in the rearwards location of the array;

FIG. 11 is a diagrammatical representation of the bin insertion sequence of the subject invention showing in a time-based manner final substantial insertion of a bin in a rearwards location of the array;

FIG. 13 is a diagrammatical representation of a bin extraction sequence showing in a time-based manner the indexing and positioning of the extractor for extraction of a rearwardly stored bin;

FIG. 14 is a diagrammatical representation of a bin extraction sequence showing final indexing followed by initial extraction of a bin to a mid-position; and FIG. 15 is a diagrammatical representation of a bin extraction sequence showing removal of the bin to a position wherein the bin is substantially fully carried on the platform.

DETAILED DESCRIPTION OF THE PREFERRED EMBODIMENTS

The present invention relates to an automated article storage and retrieval system and, in a currently preferred form of the invention, to a vertically-oriented arrangement having two pairs of confrontingly opposed or facing arrays (or towers, columns or rack) in each of which a plurality of vertically-spaced tray (or bin) locations are defined. In the recesses defined by the space between each opposing pair of columns, a platform moves upwardly and downwardly and carries a shuttle table which traverses horizontally from side to side to provide access to each of the pairs of arrays. An extraction device is carried on the platform for engaging a selected tray (or bin), and displacing that tray horizontally upon the platform, such that the tray can be delivered to a receiving section of the column or transported via the platform to another location in the rack.

Figure 1:
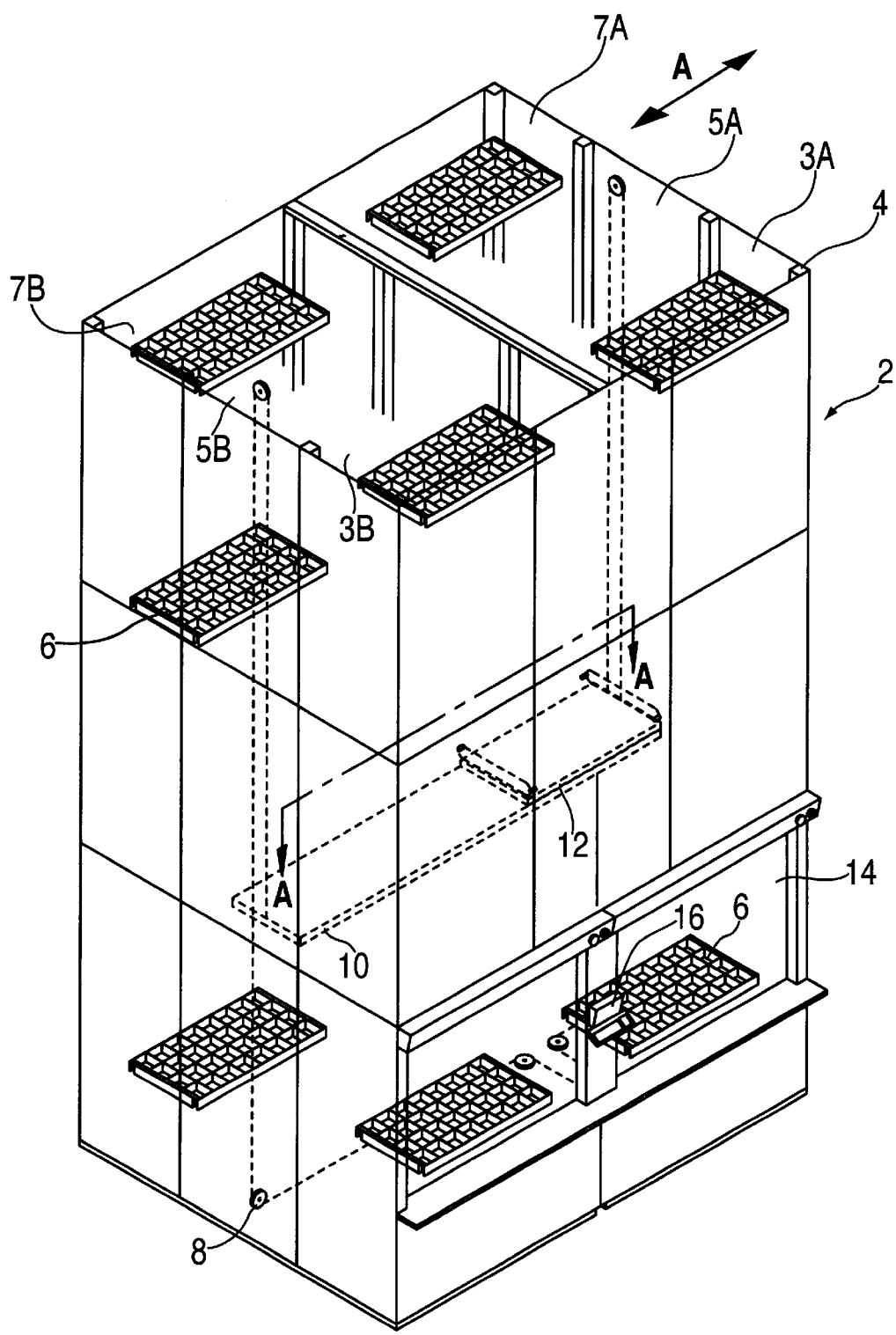
FIG. 1 is an overview of an automated storage and retrieval system showing certain of the components visible from the perspective, in accordance with the present invention.
Figure 2:
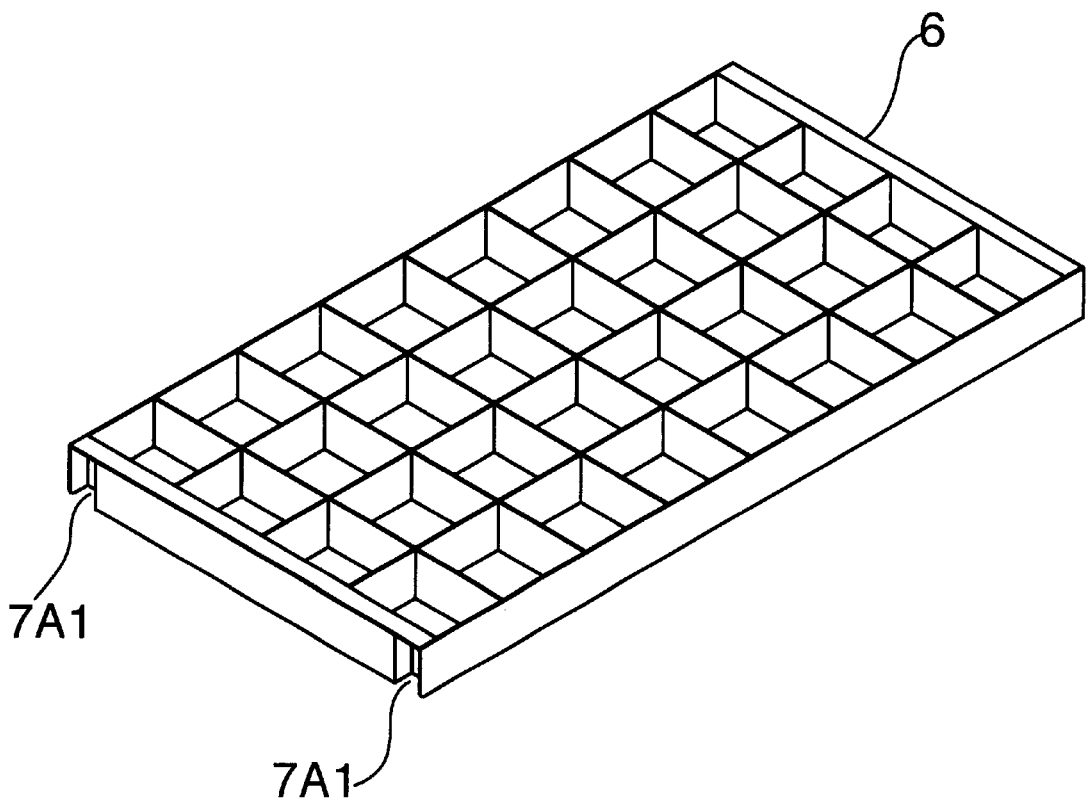
FIG. 2 is a perspective view of a bin.
Figure 3A:
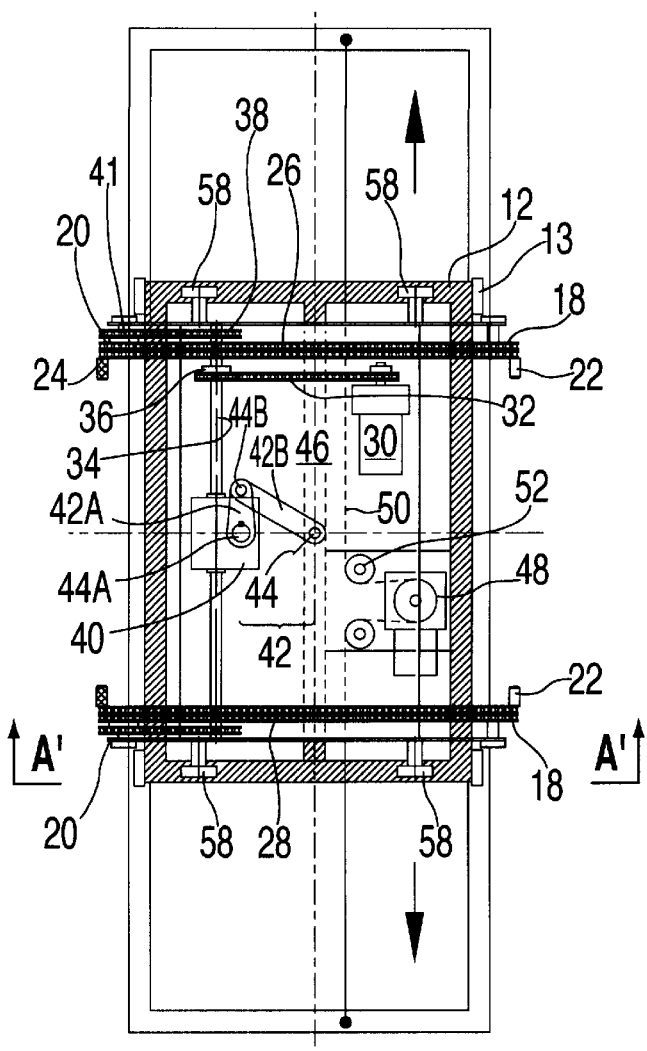
FIG. 3A is a perspective view, taken along line A—A in FIG. 1, showing the indexing/extraction mechanism of the instant invention.
Figure 3B:
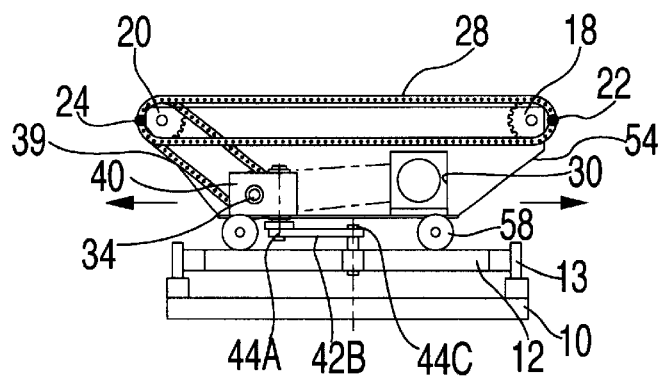
FIG. 3B is a perspective view, taken along line A'—A' in FIG. 3A.
Figure 4:
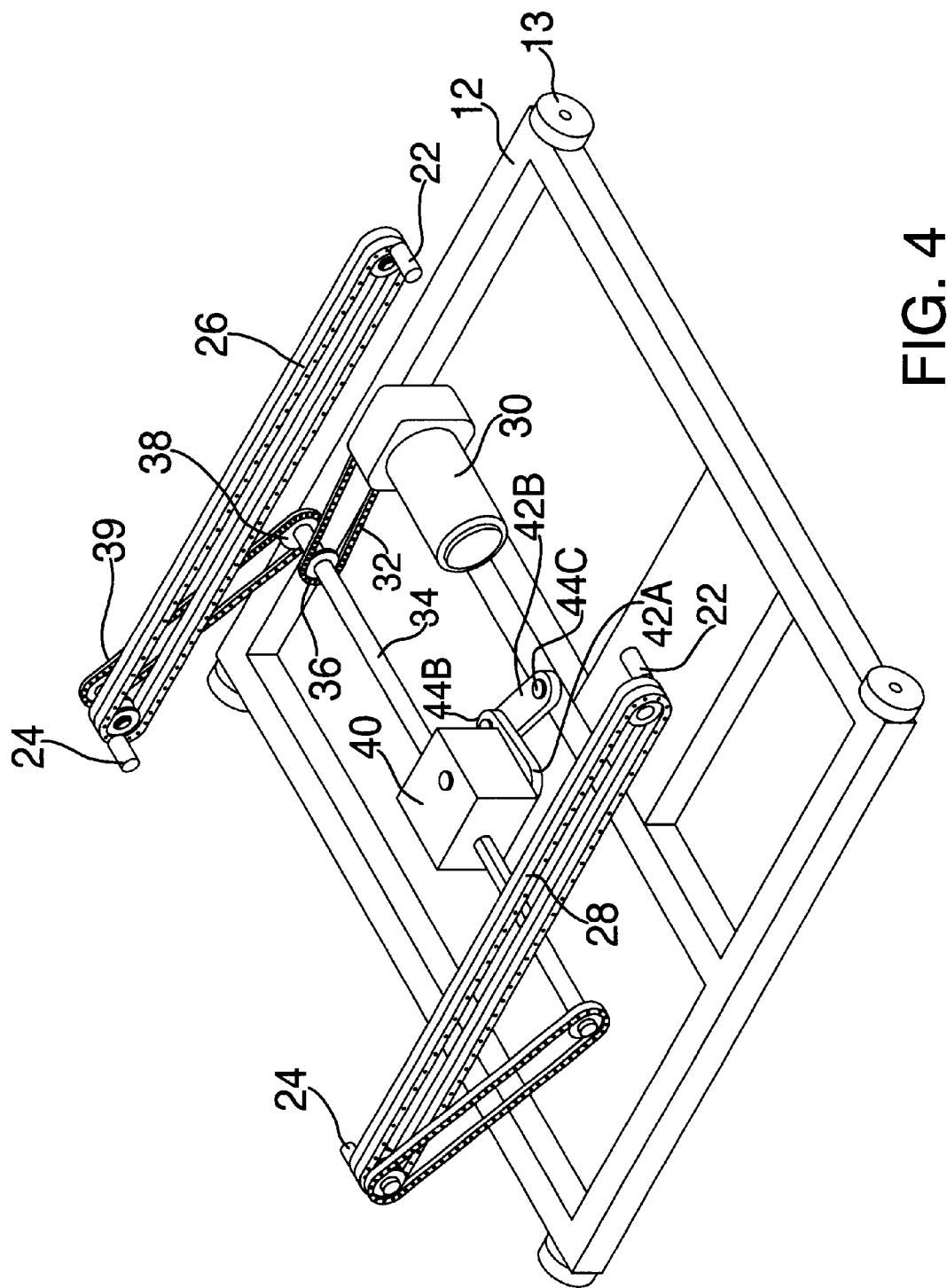
FIG. 4 is an elevated perspective view of the major operating components of the indexing/insertion/extraction mechanism of the instant invention.

With specific reference to the drawings, a three dimensional perspective view of a preferred embodiment of the invention is shown in FIG. 1, a representative bin is shown in FIG. 2, a downwardly directed view of the platform, shuttle table and indexing/extraction mechanism is shown in FIG. 3A, a sidewardly directed view in FIG. 3B, a perspective view of the preferred indexing/insertion/extraction mechanism in FIG. 4, sequenced views in FIGS. 5 through 8, and time-based insertion/extraction diagrams, showing relative positioning of the bin, extractor and pins, with indexing, is shown in FIGS. 9 through 15.

In particular reference to FIG. 1, an overall three-dimensional design of a preferred embodiment of the subject invention is shown, wherein automated storage and retrieval system 2 has a forward bin storage area 3, central access area 5 and rear storage area 7 defined and configured in a number of different manners by use of rack structure 4. It should be observed that this structure 4 comprises a pair of arrays, in which each array has two columns defining storage areas 3 and 7, and central access area 5. The array is like a matrix in which a plurality of bin locations are provided (3A, 3B, 5A, 5B, 7A, 7B). In the bins, a customer can store parts for easy access through the access area 14. In the bins are stored palettized loads like that shown in bin 6. In this configuration, a user can access controller 16 which, through typical microprocessor control, will deliver to access area 14 the proper, designated bin holding the parts sought to be removed for the automated storage and retrieval system 2. The controller 16 causes pulley and cable assembly 8 to carry platform 10 in an upwards or downwards (vertical manner) to allow shuttle table 12 to be positioned in front of the proper tray or storage location for removal of the bin therein contained. Pulley and cable assembly 8 is driven by a motor (not shown). In this manner, a single platform can be used to access two arrays each having a pair of confrontingly-opposed columns for storage of bins. Thus, a single controller for an indexer/extraction assembly can be used to provide access to virtually double the capacity of standard stand-alone systems of the prior art. A single motor is engaged to drive the platform. In arrangements heretofore known, the controller would be duplicated, and the drive motor for lifting the platform would be duplicated, to enable access to substantially the same number of storage locations. It can thus be observed that the instant invention possesses improved efficiency, by reducing components necessary for access to locations. Additionally, the present invention allows access to a bin at the same time as the machine is delivering or returning another bin. In comparison, prior devices sit in idle until an instruction is received to return a bin. While returning the bin, the operator is in idle awaiting delivery of the next bin.

Shuttle table 12, as shown in greater detail in the subsequent drawings, is caused to move in the horizontal plane from one pair of the arrays to the other through the co-linear access area, shown in this preferred embodiment to provide access for the indexing/extraction assembly (not shown). It should be observed that while FIG. 1 reveals a particular configuration wherein access area 5A and 5B are linearly displaced, regions 3A, 5A and 7A can be displaced or juxta-positioned in the direction of arrow A such that the access regions while still linearly displaced, are not linearly confrontingly opposed. Indeed, it should be further appreciated that a number of arrays can be stacked along line A, with either a co-extensive platform 10, or platform 10 being carried on a stacker attached to a rail, as in a mini-load configuration. All of these modifications fall within the scope of the instant invention, and one of ordinary skill in the art, armed with the instant invention, will easily be capable of making the necessary modifications to the design without deviating from that scope.

FIG. 2 shows a perspective view of a bin 6 showing the front recesses or bin engagement members or means 7A1, in which, under the preferred embodiment the fingers carried on the indexer/extractor are inserted. Bin engagement members 7A1 are also on the other side of the bins, to allow the bins to allow crossovers from one side of columns to the other. It should be appreciated that each bin 6 may be configured in accordance with customer specifications to hold appropriate parts for storage.

FIGS. 3a and 3b a detailed perspective view, taken along line A—A of FIG. 1, showing the indexing/insertion extraction mechanism of the subject invention, supported by platform 10 upon which shuttle table 12 is positioned, rollably, by way of shuttle wheels 13 which enable the shuttle table to traverse the distance from one end of platform 10 to the other. Shuttle table 12 in turn supports the entire indexing/extraction mechanism. In particular, rearward sprockets 18 and forward sprockets 20 have trained about them two pairs of bar-driving endless chains 26 and 28. Each of the pairs of endless chains 26 and 28 carry one of the pairs of finger engagement pins 22 and 24. Each of these pins are displaced between the respective pair of chains such that torsional movement is minimized. The pins are likewise aligned such that they are collinear on a line drawn from one pair of chains 26 carrying one of the pair of pins 22 to the other side where the other of the pair of pins 22 is carried on the other chains 28. Alternatively (as shown in FIGS. 5C, 5D), between endless chains 26 and 28 are positioned a first bar 22a and a second bar 24a. In either instance, whether pins or bars, the insertion/extraction sequence of the bins is in gearingly synchronized movement with linkage assembly 42, as discussed in greater detail below.

The instant invention has a single motor drive 30 which engages, in gearingly synchronized manner both an indexer/extractor drive shaft 34 as well as a drive sprocket 38. The motor 30 has a motor drive chain 32 which engages the sprocket 36 on indexer/extractor drive shaft 34, so that as the motor is driven, shaft 34 is caused to turn. Shaft 34 engages sprocket 38, about which another endless chain 39 (see, e.g., FIG. 3B) is trained. Endless chain 39 drives sprocket 41 (see, e.g., FIGS. 5a and 5c) which drives the dual pair of fingers or bars assembly moving pins 22 and 24 or bars 22A and 24B by driving sprockets 18 and 20 and endless chain pairs 26 and 28. Thus, the gearing among and between sprockets 36, 38, and 41 determine the extent of movement of pins 22 and 24 or bars 22A and 24A in their elliptically-defined paths.

It should be appreciated that chains 26 and 28 are configured as pairs so that each of pins 22 and 24 are connected between each pair of chains, to thereby avoid torsional movement of the pins upon engagement with the recesses 7A1 on the bins 6, as discussed above. Where full bars 22a and 24b are extended from chains 26 to 28, these chains can be single, rather than pairs, as shown in FIGS. 5C and 5D.

Shaft 34 also engages reducer/indexer 40, as shown in FIG. 3A. Under a currently preferred embodiment, reducer/indexer 40 comprises a worm gear having reducer input and output. The reducer output attaches to linkage assembly 42. Linkage assembly 42 comprises two elongated members or linkage rods 42A and 42B which pivot about three points of pivot 44A, B, and C. Linkage rod 42A traverses circularly about pivot point 44A, causing linkage rod 42B, connecting pivot point 44B and 44C, to pass in arc-like directions. Pivot point 44C is typically a bearing assembly to a rod that attaches to a frame portion 46 on the shuttle table 12. In this manner, and as described in greater detail in the drawings below, turning of reducer 40 provides linear movement of the entire indexing/extraction mechanism to index the mechanism towards and away from bins, and to provide engagement of the pins or rods for insertion and extraction. Index support structure 54 is thereby caused to move, and engages shuttle table 12 by wheels 58. In turn, shuttle table 12 rides on platform 10 via wheels 13.

The entire shuttle table 12 having mounted thereupon for linear movement in directions perpendicular to arrow A' in FIG. 3A the indexer/extractor assembly, is caused to move in the direction of arrow A' by drive motor 48. In this embodiment, motor 48 engages belt or chain 50 which in turn is guided by a pulley assembly 52 for such longitudinal movement.

FIG. 3B show a perspective view of the indexing/extraction mechanism of the subject invention viewed along line A'—A' of FIG. 3A. In FIG. 3B, clearly observable are sprockets 18 and 20 and second endless-bar-driving chain pairs 28. Also shown are first finger pairs 22 and second finger pairs 24 in a neutral or quiescent state. Reducer 40, driven by chains 32 and motor 30 is shown by side view, behind which is visible drive chain 39 for driving the extractor/insertion chain and finger/pin assemblies. The entire structure is supported by a chassis 54, which attaches for movement to wheels 58 for movement on shuttle table 12. Also shown are wheels 13 for movement of shuttle table 12 upon the platform 10.

FIG. 4 shows a perspective view of the indexer/extractor in accordance with a preferred embodiment, clearly showing pin pairs 22 and 24 carried by chain pairs 26 and 28 respectively, and driven by motor 30. In this view, the motor can be seen driving sprocket 36 which drives shaft 34, in turn driving reducer 40, while simultaneously driving sprocket 38 which, via chain 39 drives movement of chains 26 and 28, in turn moving pins 22 and 24.

Figure 5A:
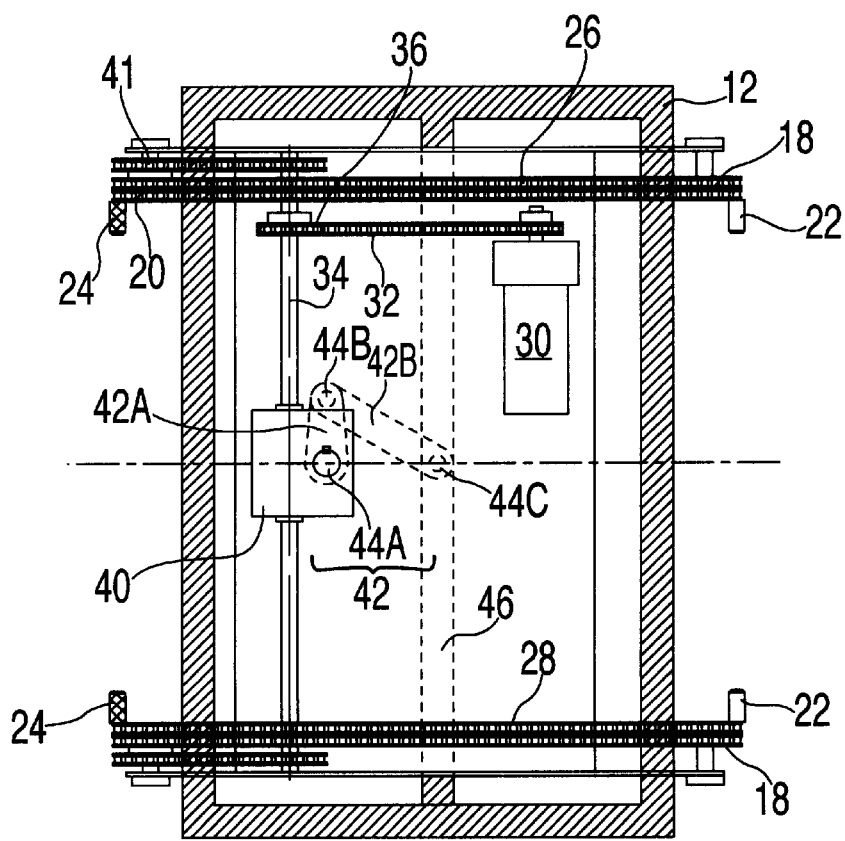
FIGS. 5A and 5B show the views of the invention shown in FIGS. 3A and 3B, respectively, showing the instant invention's positioning in the initial position or neutral or quiescent state.
Figure 5B:
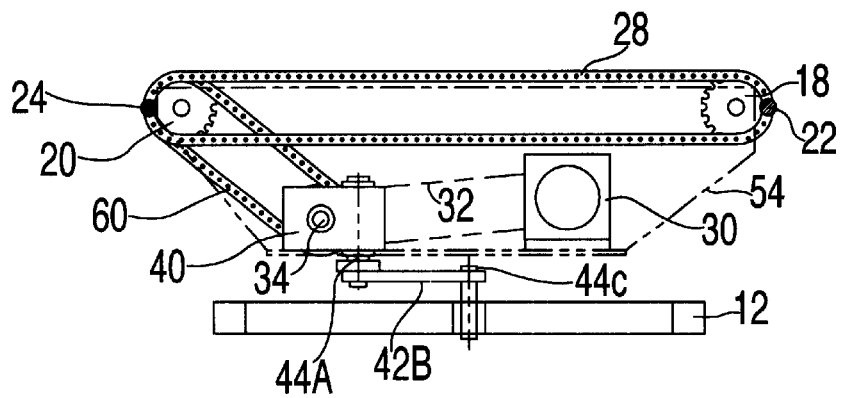

FIGS. 5A and 5B show the views of the invention shown in FIGS. 3A and 3B, respectively, in expanded view, and in the quiescent or neutral state, in which the assembly in not indexed but is positioned evenly upon shuttle table 12. FIGS. 5C and 5D show the identical positioning as shown in FIGS. 5A and 5B; however instead of pins, bars 22A and 24A are shown, under an alternative embodiment.

Figure 6A:
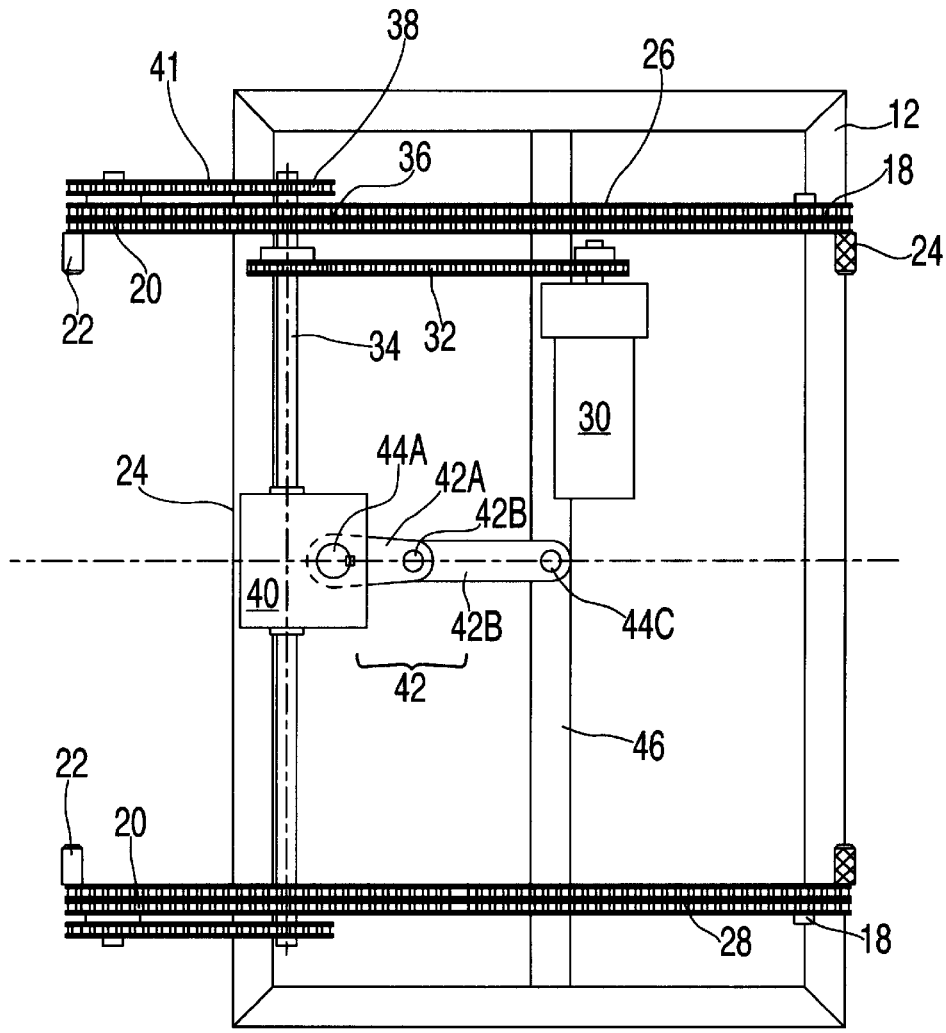
FIGS. 6A and 6B show the views of the invention shown in FIGS. 3A and 3B, respectively, showing the instant invention's positioning in the extreme, extended front position, that is with the indexing mechanism fully extended to provide for engagement or disengagement of the fingers with the engagement recesses of a targeted bin.
Figure 6B:
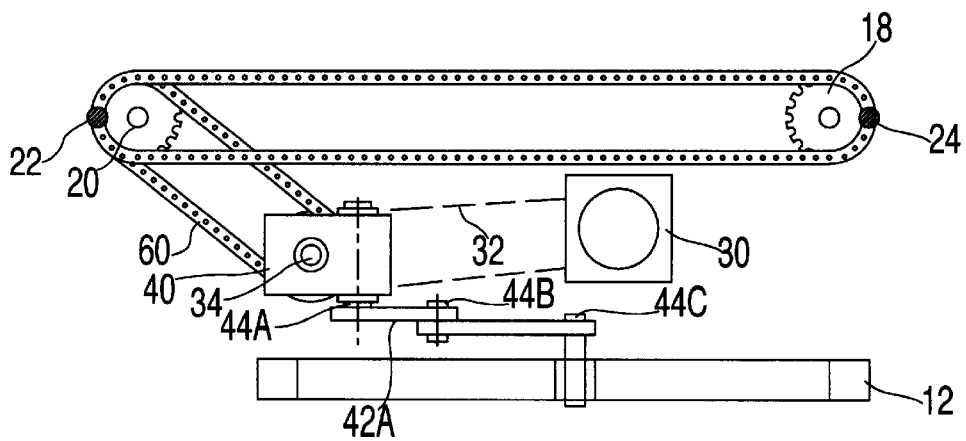
Figure 8A:
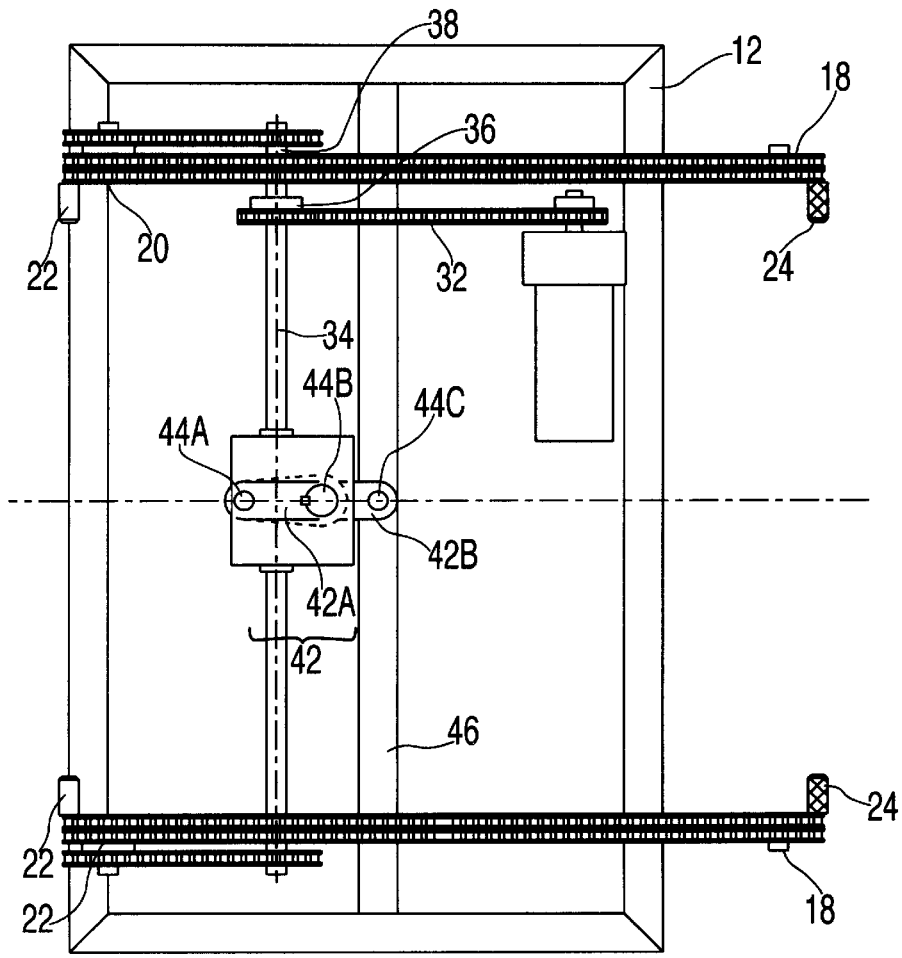
FIGS. 8A and 8B show the views of the invention shown in FIGS. 3A and 3B, respectively, showing the instant invention's positioning in the extreme rear position, that is with the indexing mechanism fully extended in the rearwards direction for engagement or disengagement by the fingers of a targeted bin located behind the extractor.
Figure 8B:
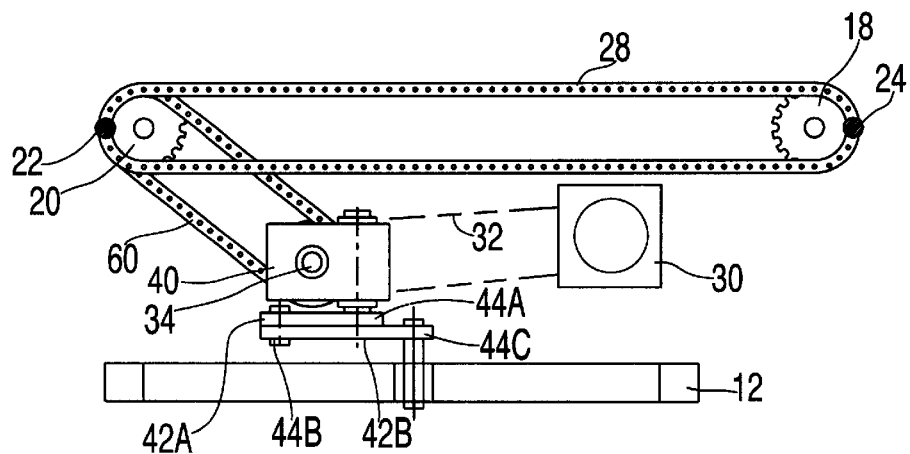

From the neutral position, two other extreme positions are recognizable, and are shown in FIGS. 6A, B and FIGS. 8A, B. In particular FIGS. 6A, B show the extreme front extended position of the extractor, extreme extension occurring by full extension of linkage assembly 42. This has resulted from turning of reducer 40. It should be observed that displacement has occurred to the left in the drawing relative to shuttle table 12.

Likewise, from the neutral position, extreme rear positioning is shown in FIGS. 8A, B. Linkage assembly 42 maintains linkage rods 42A and 42B virtually on top of one other to achieve this position. It should be further observed that the entire assembly, including motor 30 moves as the reducer 40 is driven by shaft 34. Frame portion 46 is coupled to linkage 42 to enable equal indexing of the assembly in either the frontwards/forward direction or rearwards direction, as required. A control system (not shown) directs motor 30 operation to achieve the positions shown in FIGS. 6A, B and FIGS. 8A, B and all positions in between.

It is apparent that gearing ratios are important to accurate movement. Linkage assembly 42 thus extends from a smallest to largest distance $d_{linkage}$ comprising the length of first elongated member 42A from the first (44A) to the second (44B) point of pivot and thereby indexing the extraction mechanism an index distance (d) from a neutral position $d_0$ to a minimum/maximum distance $\pm d_{linkage}$.

$$d = d_{linkage} \sin K n_t$$

and K represents a constant derived from sprocket size, chain length and reducer gear ratio, and $n_t$ is a movement of the engagement rods as a measured by the number of teeth moved by the sprockets, and further wherein:

$$\tfrac{1}{2}(n_c/n_s) = \tfrac{1}{4} n_d$$

and $n_c$ is the number of teeth in the chain, $n_s$ is the number of teeth on the sprocket, and $n_d$ is the reducer gear ratio.

Figure 7A:
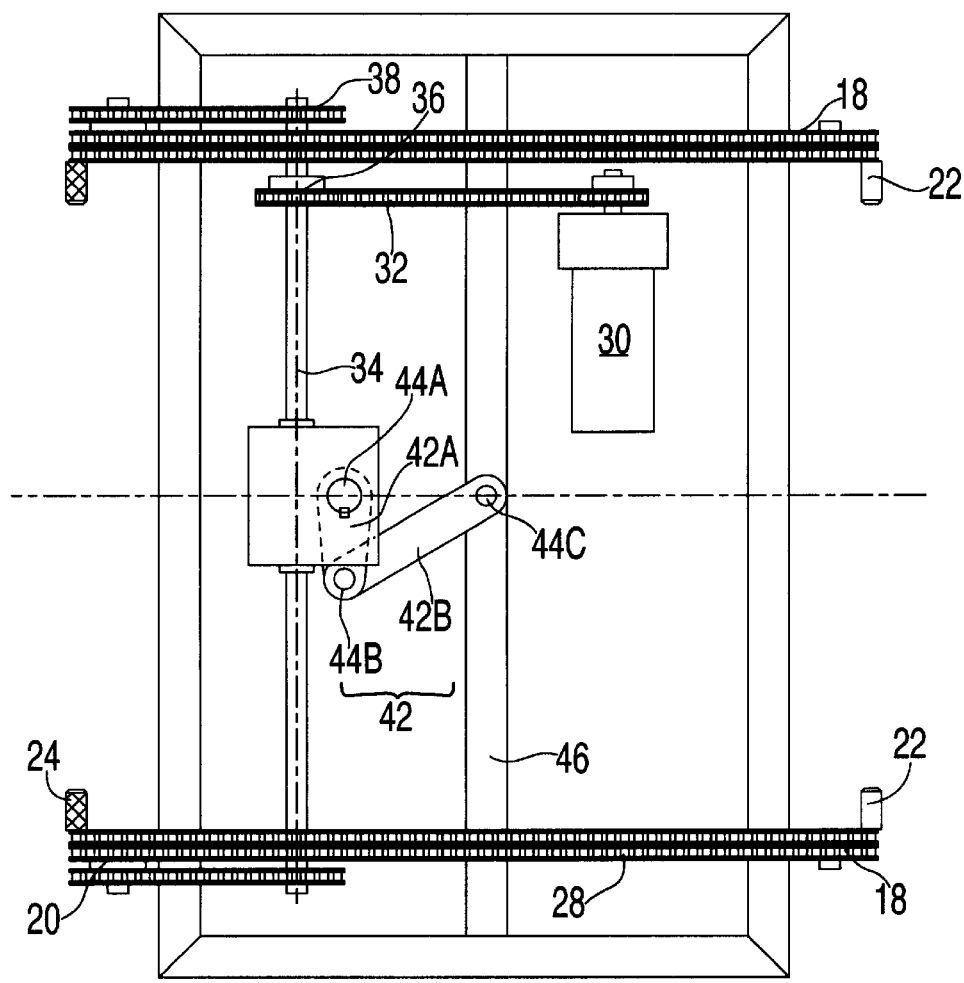
FIGS. 7A and 7B show the views of the invention shown in FIGS. 3A and 3B, respectively, showing the instant invention's positioning in the center position after having engaged and removed a targeted bin onto the platform.
Figure 7B:
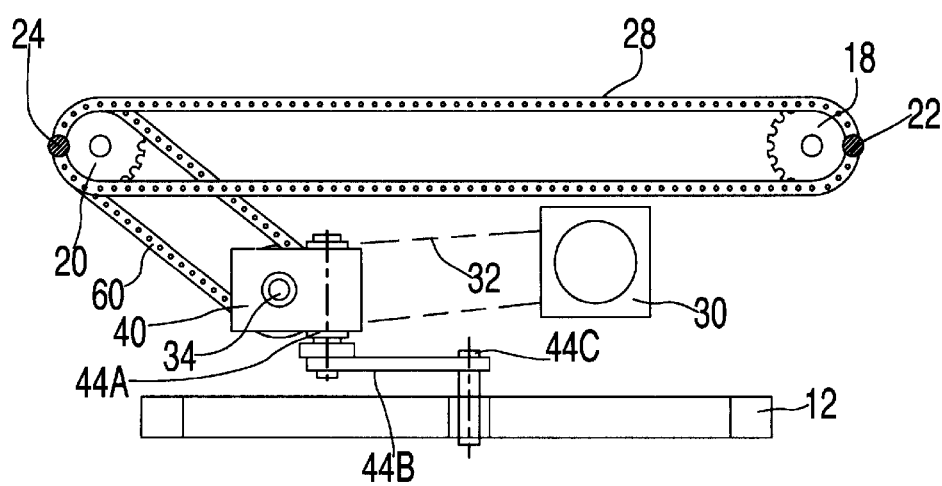

FIGS. 7A, B show the indexer/extractor in a central position, as in when a bin is on the platform. As will become more apparent with reference to the synchronized diagrams below, this position typifies a "bin on board" situation, where the bin has been caused to be removed from its location and stowed aboard the extractor.

In FIG. 9, a bin insertion sequence is shown in diagrammatical form, in which tooth-by-tooth indexing is shown to depict the synchronized manner in which indexing occurs simultaneously with the motion of fingers/pins or bars 22 and 24. Such indexing is required, it should be observed to enable the pins or bars to enter into the bar engagement means 64 of bins 62. Absent the indexing, the pins or bars, while moving about on endless chain 28 (in clockwise direction 68) would simply "miss" the engagement means, and thus fail to engage the bins. Thus, this and the subsequent drawings show lateral movement or indexing of the assembly, displacement for which is shown by the lines at the bottom of each such figure. Thus, as second pins or bar 24 engages the engagement means 67A, and begins engagement (see 9D in FIG. 9), indexing or displacement of the assembly has also, simultaneously occurred. In this diagram, the chain 28 is assumed to have 120 teeth, and four teeth indexing (numbers 119, 118, 117) are shown.

FIG. 10 shows relative location at teeth 90, 63, 62 and 61 (10A through D, respectively) in the bin insertion sequence. It can be seen that after the chain has moved 30 teeth (or ¼ its total number of teeth), the bin is midway positioned (10A) and continuing to be pushed into rearwards location.

FIG. 11 shows teeth 60, 59, 58 and 30 in the continued rotation of chain 28 in the clockwise direction from FIG. 10, to show completion of bin insertion sequence. It should be observed that pins or bar 24 has moved out and away from the receiving member 67A on bin 66, as the indexer moves the entire assembly from the bins, to allow a neutral position (11D) for the platform to be able to move to another location.

Figure 12A:
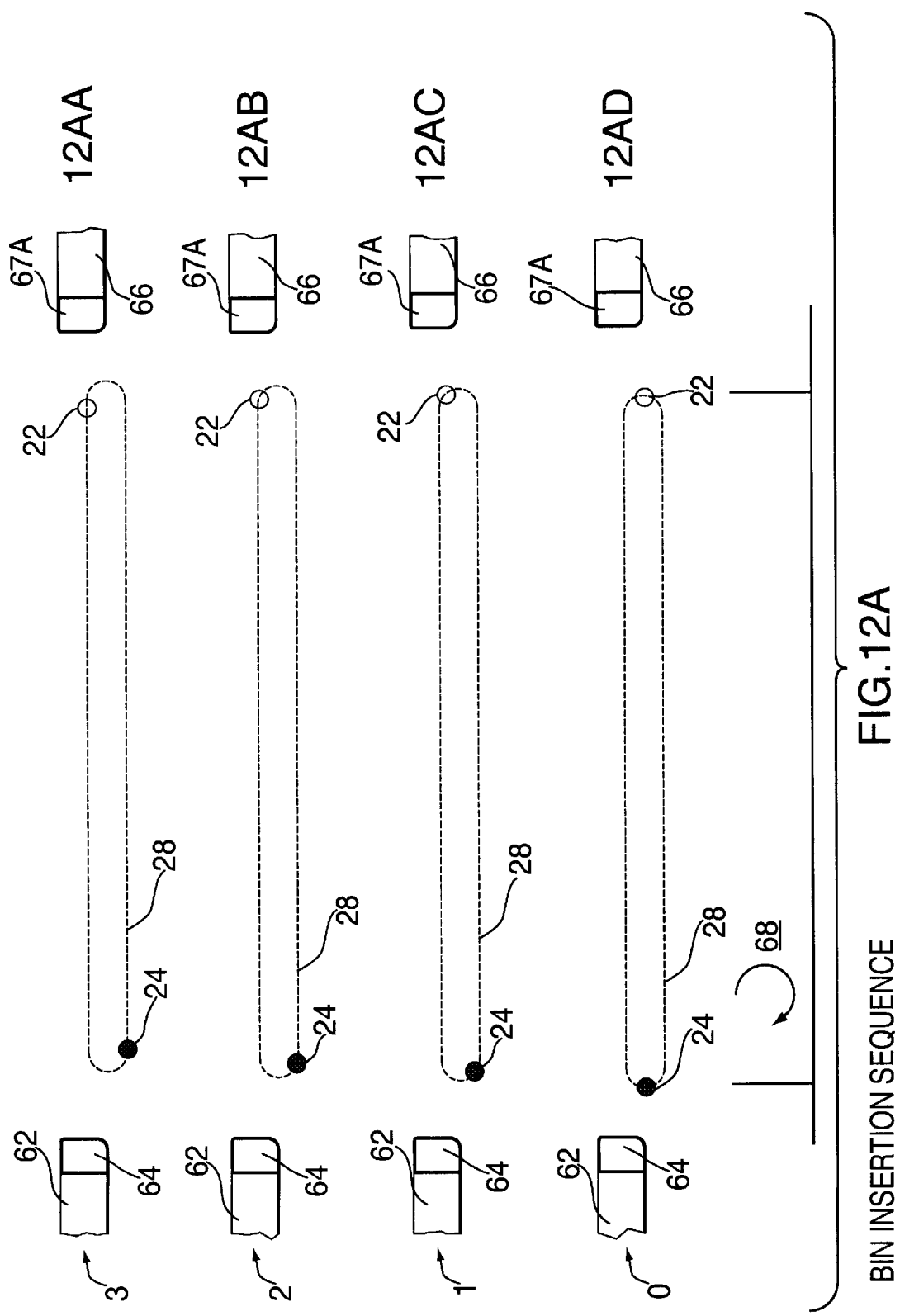
FIG. 12A is a diagrammatical representation of the bin insertion sequence showing continued movement in a time-based manner.

FIG. 12A diagrammatically shows a distinction from prior art devices, by showing the first four positions based upon teeth of the 120 tooth chain 28 from tooth 0 (12AD) to tooth 3 (12AA). This drawing shows the last four steps of bin insertion from 12AA to 12AD.

Figure 12B:
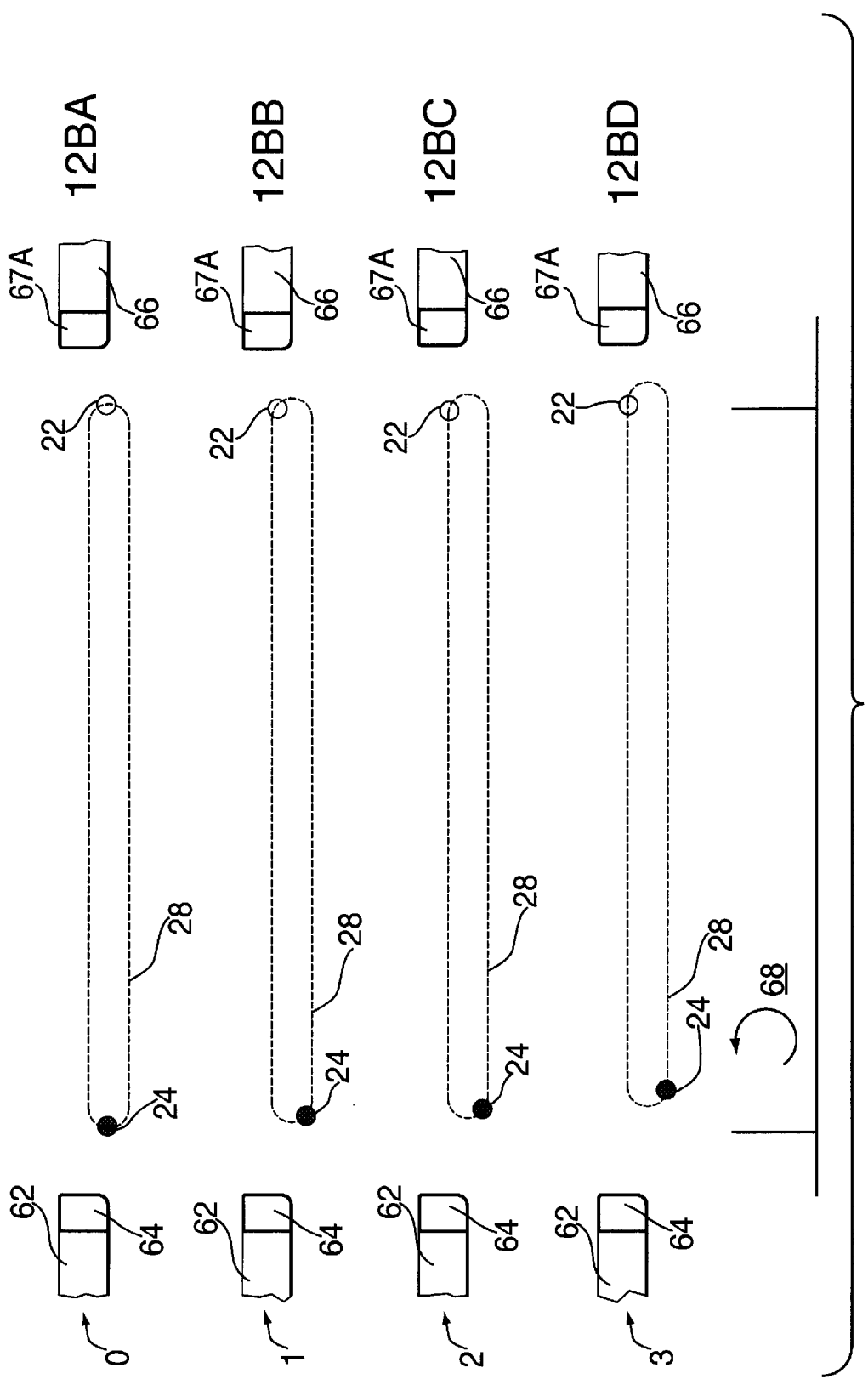
FIG. 12B is a diagrammatical representation of the first phase of a bin extraction sequence of a rearwards bin.

FIG. 12B diagrammatically shows the first four positions based upon teeth of the 120 tooth chain 29 for bin extraction, from tooth 0 (12BA) to tooth 3 (12BD). In the counterclockwise rotation of chain 28 for extraction, first pins or bar 22 passes the bins, as in insertion.

FIG. 13 shows the continued bin extraction sequence. The chain 28 is now being driven in a counterclockwise direction, wherein first pins or bar 22 is caused to first pass completely by the bin before pins or bar 24 engages same. The indexer moves the extractor into close proximity before the pins or bar 24 engages. From 30 to 60 teeth movement (of the 120 tooth chain) are shown (13A–13D).

FIG. 14 shows the continued bin extraction sequence from tooth 61 (14A) through tooth 90 (14D). In this instance the indexer has moved the assembly and second pins or bar 24 engages the lip 67A and commences extraction of bin 66 into a halfway point (14D).

FIG. 15 shows completion of the bin extraction sequence until the bin is substantially supported by the platform. It should be observed that while the second pins or rod 24 are pivoting about the sprocket, lateral movement of the bin is substantially performed by the indexing mechanism.

While there have been shown, described and pointed out fundamental novel features of the invention as applied to preferred embodiments thereof, it will be understood that various omissions and substitutions and changes in the form and details of the device illustrated and in its operation may be made by those skilled in the art without departing from the spirit of the invention. It is the intention, therefore, to be limited only as indicated by the scope of the claims appended hereto.

We claim:

1. An indexing/insertion/extraction mechanism for pulling bins housed in at least two pairs of confrontingly-opposed arrays in an automated storage and retrieval system having an access region defined between each of said arrays, in which each of said bins has identical front and back engagement members, the mechanism comprising:

a platform vertically displaceable in said access regions between said pairs of arrays;

a shuttle table rollably mounted upon said platform for horizontal displacement thereupon between said pairs of arrays;

an extractor assembly supported by said shuttle table for causing horizontal insertion/extraction of bins from/ onto said shuttle table, said assembly comprising at least a pair of endless chains each trained about first and second pairs of extractor sprockets, a drive rod positioned between one of said pairs of extractor sprockets, and two pairs of bin engagement pins each pair confrontingly protruding and aligned along a line that traverses the distance between said endless chains for engaging said bin engagement members, such that as said drive rod is driven said bin engagement pins are caused to travel between and about said first and second pairs of extractor sprockets;

a reducer having input and output portions for indexingly engaging said extractor assembly for indexing said extractor assembly toward and away from the bins in gearingly synchronized sequence with the simultaneous driving of said pairs of engagement pins, in which the reducer input portion is driven by said drive rod and the reducer output portion in turn drives a linkage assembly;

said drive rod driven by a drive rod sprocket and in turn driving said extractor sprockets and said endless chains gearingly causing said driving of said drive rod for said endless chains simultaneously with said reducer input portion;

said linkage assembly comprising a pivotally mounted pair of elongated members that pivot at three points of pivot, in which one of said members is attached at the first point of pivot to the reducer output portion of said reducer, said one of said members is attached at the second point of pivot to said second elongated member which in turn is attached at the third point of pivot to a vertical linkage shaft, such that as said reducer portion is caused to rotate, said rotation in turn causes circular rotation of said first elongated member and swinging rotation of said second member thereby linearly extending the linkage assembly from a smallest to largest distance $d_{linkage}$ comprising the length of said first elongated member from the first to the second point of pivot and thereby indexing the extraction mechanism an index distance (d) from a neutral position $d_0$ to a minimum/maximum distance $\pm d_{linkage}$; and drives means for causing said vertical linkage shaft to travel in a substantially straight-pathed groove in said shuttle table; and a single motor for cooperatively driving said indexing and said movement of said bin engagement pins by chain engagement driving of said drive rod sprocket.

2. The mechanism of claim 1, wherein:

$$d = d_{linkage} \sin Kn_t$$

and K represents a constant derived from sprocket size of said extractor sprockets, chain length of said pair of endless chains and reducer gear ratio of said reducer, and $n_t$ is a movement of the engagement pins as measured by the number of teeth moved by the extractor sprockets, and further wherein:

$$\tfrac{1}{2}(n_c/n_s) = \tfrac{1}{4} n_d$$

and $n_c$ is the number of teeth in each of said endless chains, $n_s$ is the number of teeth on each of said extractor sprockets, and $n_d$ is the reducer gear ratio.

3. An indexing/insertion/extraction mechanism for pulling bins housed in at least two pairs of confrontingly-opposed arrays in an automated storage and retrieval system having an access region defined between each of said arrays, in which each of said bins has an identical front and back engagement member, the mechanism comprising:

platform vertically displaceable in said access regions between said pairs of arrays;

a shuttle table rollably mounted upon said platform for horizontal displacement thereupon between said pairs of arrays;

an extractor assembly supported by said shuttle table for causing horizontal insertion/extraction of bins from/onto said shuttle table, said assembly comprising a pair of endless chains each trained about first and second pairs of extractor sprockets, a drive rod positioned between one of said pairs of extractor sprockets, and two bin engagement rods each traversing the distance between said endless chains for engaging said bin engagement members, such that as said drive rod is driven said bin engagement rods are caused to travel between and about said first and second pairs of extractor sprockets;

a reducer having input and output portions for indexingly engaging said extractor assembly for indexing said extractor assembly toward and away from the bins in gearingly synchronized sequence with the simultaneous driving of said pair of engagement rods, in which the reducer input portion is driven by said drive rod and the reducer output portion in turn drives a linkage assembly;

said drive rod driven by a drive rod sprocket and in turn driving said extractor sprockets and said endless chains gearingly causing said driving of said drive rod for said endless chains simultaneously with said reducer input portion;

said linkage assembly comprising a pivotally mounted pair of elongated members that pivot at three points of pivot, in which one of said members is attached at the first point of pivot to the reducer output portion of said reducer, said one of said members is attached at the second point of pivot to said second elongated member which in turn is attached at the third point of pivot to a vertical linkage shaft, such that as said reducer portion is caused to rotate, said rotation in turn causes circular rotation of said first elongated member and swinging rotation of said second member thereby linearly extending the linkage assembly from a smallest to largest distance $d_{linkage}$ comprising the length of said first elongated member from the first to the second point of pivot and thereby indexing the extraction mechanism an index distance (d) from a neutral position do to a minimum/maximum distance $\pm d_{linkage}$; and drives means for causing said vertical linkage shaft to travel in a substantially straight-pathed groove in said shuttle table; and a single motor for cooperatively driving said indexing and said movement of said bin engagement bars by chain engagement driving of said drive rod sprocket.

4. The mechanism of claim 3, wherein:

$$d = d_{linkage} \sin Kn_t$$

and K represents a constant derived from sprocket size of said extractor sprockets, chain length of said pair of endless chains and reducer gear ratio of said reducer, and $n_t$ is a movement of the engagement rods as measured by the number of teeth moved by the extractor sprockets, and further wherein:

$$\tfrac{1}{2}(n_c/n_s) = \tfrac{1}{4} n_d$$

and $n_c$ is the number of teeth in each of said endless chains, $n_s$ is the number of teeth on each of said extractor sprockets, and $n_d$ is the reducer gear ratio.

* * * * *